(12) United States Patent
Meng et al.

(10) Patent No.: US 9,749,427 B2
(45) Date of Patent: *Aug. 29, 2017

(54) SYSTEMS AND METHODS FOR CONSENSUS PROTOCOL SELECTION BASED ON DELAY ANALYSIS

(71) Applicant: International Business Machines Corporation, Armonk, NY (US)

(72) Inventors: Shicong Meng, Fremont, CA (US); Xiaoqiao Meng, Millwood, NY (US); Jian Tan, Santa Clara, CA (US); Xiao Yu, Atlanta, GA (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 14/550,171

(22) Filed: Nov. 21, 2014

(65) Prior Publication Data

US 2016/0150059 A1 May 26, 2016

(51) Int. Cl.
*H04L 29/08* (2006.01)
*H04L 12/26* (2006.01)
*H04L 29/06* (2006.01)

(52) U.S. Cl.
CPC ............ *H04L 67/16* (2013.01); *H04L 67/10* (2013.01); *H04L 67/28* (2013.01); *H04L 69/02* (2013.01)

(58) Field of Classification Search
CPC ...................................................... H04L 67/16

USPC ................................................ 709/230, 224
See application file for complete search history.

(56) References Cited

U.S. PATENT DOCUMENTS

| 2007/0168244 | A1* | 7/2007 | Dan ................... G06F 9/50 705/7.12 |
|---|---|---|---|
| 2013/0091284 | A1 | 4/2013 | Rothschild |
| 2013/0325950 | A1 | 12/2013 | Laden et al. |
| 2014/0101484 | A1 | 4/2014 | Aron et al. |

OTHER PUBLICATIONS

Singh et al., "BFT Protocols Under Fire", 2008, entire document.*
"Byzantine Fault Tolerance From Static Selection to Dynamic Selection", Ali Shoker, 2012.*
C. Somarakis et al., "Asymptotic Consensus Solutions in Non-Linear Delayed Distributed Algorithms Under Deterministic & Stochastic Perturbations," Proceedings of the 52nd IEEE Conference on Decision Control, Dec. 2013, pp. 7821-7826, Florence, Italy.

(Continued)

*Primary Examiner* — Douglas Blair
*Assistant Examiner* — Jonathan A Sparks
(74) *Attorney, Agent, or Firm* — Alexa L. Ashworth; Ryan, Mason & Lewis, LLP

(57) ABSTRACT

A method for selecting a consensus protocol comprises separating a consensus protocol into one or more communication steps, wherein the consensus protocol is useable to substantially maintain data consistency between nodes in a distributed computing system, and wherein a communication step comprises a message transfer, attributable to the consensus protocol, in the distributed computing system, and computing an estimated protocol-level delay based on one or more attributes associated with the separated communication steps of the consensus protocol.

6 Claims, 13 Drawing Sheets

(56) References Cited

OTHER PUBLICATIONS

Wikipedia, "Paxos (Computer Science)," http://en.wikipedia.org/w/index.php?title=Paxos_(computer_science) &printable=yes, May 2014, 20 pages.

F. Junqueira et al., "Classic Paxos vs. Fast Paxos: Caveat Emptor," Proceedings of the 3rd Workshop on Hot Topics in System Dependability (HotDep), 2007, 6 pages, Article No. 18.

G.M.D. Vieira et al., "The Performance of Paxos and Fast Paxos," Proceedings of the 27th Brazilian Symposium on Computer Networks, May 2009, pp. 291-304, Recife, Brazil.

T. Anderson et al., "Replication, Consistency, and Practicality: Are These Mutually Exclusive?" Proceedings of the ACM SIGMOD International Conference on Management of Data, Jun. 1998, pp. 484-495, vol. 27, No. 2.

J. Baker et al., "Megastore: Providing Scalable, Highly Available Storage for Interactive Services," Proceedings of the 5th Biennial Conference on Innovative Data System Research (CIDR), Jan. 2011, pp. 223-234.

A. Burger et al., "Performance of Multiversion and Distributed Two-Phase Locking Concurrency Control Mechanisms in Distributed Databases," Information Sciences: an International Journal, Jan. 1997, pp. 129-152, vol. 96, No. 1-2.

B. Ciciani et al., "Analysis of Replication in Distributed Database Systems," IEEE Transactions on Knowledge and Data Engineering, Jun. 1990, pp. 247-261, vol. 2, No. 2.

J.C. Corbett et al., "Spanner: Google's Globally-Distributed Database," 10th USENIX Symposium on Operating Systems Design and Implementation (OSDI), 2012, pp. 251-264.

G. Decandia et al., "Dynamo: Amazon's Highly Available Key-Value Store," Proceedings of the 21st ACM SIGOPS Symposium on Operating Systems Principles (SOSP), Dec. 2007, pp. 205-220, vol. 41, No. 6.

J. Gray et al., "The Dangers of Replication and a Solution," Proceedings of the ACM SIGMOD International Conference on Management of Data, Jun. 1996, pp. 173-182, vol. 25, No. 2, Montreal, Canada.

B.-C. Jenq et al., "A Queueing Network Model for a Distributed Database Testbed System," IEEE Transactions on Software Engineering, Jul. 1988, pp. 908-921, vol. 14, No. 7.

R. Jiménez-Peris et al., "Are Quorums an Alternative for Data Replication?" ACM Transactions on Database Systems (TODS), Sep. 2003, pp. 257-294, vol. 28, No. 3.

J.F. Ren et al., "Analysis of Impact of Network Delay on Multiversion Conservative Timestamp Algorithms in DDBS," Performance Evaluation, Jul. 1996, pp. 21-50, vol. 26, No. 1.

Leonard Kleinrock, "Queueing Systems, vol. 1: Theory," IEEE Transactions on Communications, Jan. 1977, pp. 178-179.

T. Kraska et al., "MDCC: Multi-Data Center Consistency," Proceedings of the 8th ACM European Conference on Computer Systems (Eurosys), Apr. 2013, pp. 113-126, Prague, Czech Republic.

Leslie Lamport, "Paxos Made Simple," SIGACT News, Nov. 2001, pp. 51-58, vol. 32, No. 4.

Leslie Lamport, "Fast Paxos," Microsoft Research, MSR-TR-2005-112, Jul. 2005, 43 pages.

D.A. Menasce et al., "Performance Evaluation of a Two-Phase Commit Based Protocol for DDBs," Proceedings of the 1st ACM SIGACT-SIGMOD Symposium on Principles of Database Systems (PODS), 1982, pp. 247-255.

M. Nicola et al., "Performance Modeling of Distributed and Replicated Databases," IEEE Transactions on Knowledge and Data Engineering, Jul. 2000, pp. 645-672, vol. 12, No. 4.

S. Patterson et al., "Serializability, not Serial: Concurrency Control and Availability in Multi-Datacenter Datastores," Proceedings of the VLDB Endowment, Jul. 2012, pp. 1459-1470, vol. 5, No. 11.

Simpy, "Welcome to SimPy," http://simpy.readthedocs.org/en/latest/, Nov. 2014, 2 pages.

Y. Sovran et al., "Transactional Storage for Geo-Replicated Systems," Proceedings of the 23rd ACM Symposium on Operating Systems Principles (SOSP), 2011, pp. 385-400.

Wikipedia, "Tarjan's Strongly Connected Components Algorithm," http://en.wikipedia.org/wiki/Tarjan's_strongly_connected_components_algorithm, Nov. 2014, 4 pages.

Y.C. Tay et al., "Locking Performance in Centralized Databases," ACM Transactions on Database Systems, Dec. 1985, pp. 415-462, vol. 10, No. 4.

Alexander Thomasian, "Concurrency Control: Methods, Performance, and Analysis," ACM Computing Surveys (CSUR), Mar. 1998, pp. 70-119, vol. 30, No. 1.

A. Thomasian et al., "Performance Analysis of Two-Phase Locking," IEEE Transactions on Software Engineering, May 1991, pp. 386-402, vol. 17, No. 5.

A. Thomson et al., "Calvin: Fast Distributed Transactions for Partitioned Database Systems," Proceedings of the ACM SIGMOD International Conference on Management of Data, May 2012, 12 pages.

\* cited by examiner

110

150

→ MESSAGES OF POSITION $i$
–·–·→ MESSAGES OF THE LATEST LEARNED POSITION BEFORE $i$

210

250

310

330

350

370

400

500

600

700

800

900

1200

1300

1400

SYSTEMS AND METHODS FOR CONSENSUS PROTOCOL SELECTION BASED ON DELAY ANALYSIS

TECHNICAL FIELD

The field generally relates to systems and methods for selecting a consensus protocol and, in particular, systems and methods for selecting a consensus protocol based on protocol-level delays.

BACKGROUND

Providing global data services to customers across the world has become an important function for Cloud service providers. Many such services (e.g., Google® App Engine, Amazon® S3, Dropbox®, etc.) are hosted in geographically distributed datacenters to minimize local customer access latency and improve service availability. To ensure customers in different regions observe the same data view, strongly-consistent transactional replication is necessary. Implementing strongly-consistent transactional replication across datacenters requires order consensus protocols.

In general, consensus protocols can be used to reach agreement on the order of transactions. The performance of protocols determines the performance of the data service. However, understanding the performance of consensus protocols is non-trivial. There are different consensus protocols and their performance characteristics are quite different from each other. The actual performance of a protocol also depends on the underlying network characteristics.

SUMMARY OF THE INVENTION

In general, exemplary embodiments of the invention include systems and methods for selecting a consensus protocol and, in particular, systems and methods for selecting a consensus protocol based on protocol-level delays.

Embodiments of the present invention provide systems and methods for selecting a consensus protocol based on estimated latency distributions of consensus protocols. According to embodiments of the present invention, estimating the latency distribution of consensus protocols includes, for example, breaking a protocol into multiple communication steps, considering synchronization delay caused by out-of-order message delivery, using an analytical model to capture the relation between an underlying low-level delay distribution and the protocol level delay, and characterizing key advantages and disadvantages of different protocols. The systems and methods of the embodiments of the present invention work for arbitrary network communication latency distribution.

Applications of embodiments of the present invention can include, for example, performance estimation for a global data service, selecting appropriate protocols based on given underlying network characteristics, and finding optimal resource provisioning plan for a given performance requirement.

According to an exemplary embodiment of the present invention, a method for selecting a consensus protocol, comprises separating a first consensus protocol into one or more communication steps, wherein the first consensus protocol is useable to substantially maintain data consistency between nodes in a distributed computing system, and wherein a communication step comprises a message transfer, attributable to the first consensus protocol, in the distributed computing system, and computing an estimated protocol-level delay based on one or more attributes associated with the separated communication steps of the first consensus protocol.

According to an exemplary embodiment of the present invention, a computer program product for selecting a consensus protocol, comprises a non-transitory computer readable storage medium having program instructions embodied therewith, the program instructions executable by a processor to cause the processor to perform the above method.

According to an exemplary embodiment of the present invention, an apparatus for selecting a consensus protocol, comprises a memory, and a processing device operatively coupled to the memory and configured to separate a first consensus protocol into one or more communication steps, wherein the first consensus protocol is useable to substantially maintain data consistency between nodes in a distributed computing system, and wherein a communication step comprises a message transfer, attributable to the first consensus protocol, in the distributed computing system, and compute an estimated protocol-level delay based on one or more attributes associated with the separated communication steps of the first consensus protocol.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Figure 1A:
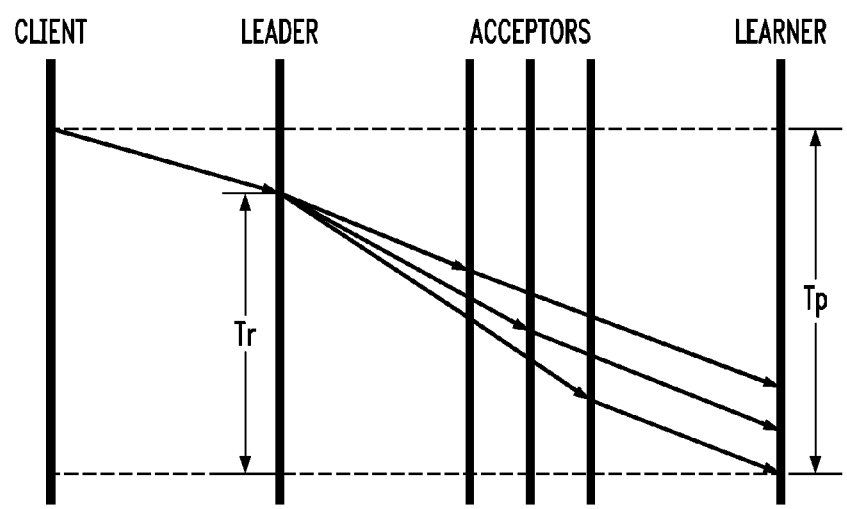
FIG. 1A is a diagram illustrating operation of an SP protocol, according to an exemplary embodiment of the invention.

Exemplary embodiments of the invention will now be discussed in further detail with regard to systems and methods for selecting a consensus protocol and, in particular, systems and methods for selecting a consensus protocol based on protocol-level delays. This invention may, however, be embodied in many different forms and should not be construed as limited to the embodiments set forth herein.

Embodiments of the present invention are explained in connection with three common order consensus protocols, including Single Leader Paxos (SP), Fast Paxos (FP) and Epoch-based Paxos (EP). Other consensus protocols are typically variations of one or more of the three common order consensus protocols discussed herein. However, it is to be understood that the embodiments of the present invention are not necessarily to the three common order consensus protocols discussed herein, and other consensus protocols may be employed in conjunction with the embodiments of the present invention.

As used herein, "consensus protocol" can refer to the process for multiple computing nodes to reach an agreement for a single value. Some of the computing nodes may fail and the consensus protocol should be fault tolerant. The process involves putting forth candidate values, communicating with all involved computing nodes and agreeing on a single consensus value. A typical approach to generate consensus is to agree on a majority value, i.e., more than half of the computing nodes proposing and agreeing on the same value. A consensus protocol ensures that at least a quorum (majority) of replicas have a shared view of a transaction order under faulty conditions and arbitrary network delay. This is done using, for example, the Paxos protocol.

As used herein "Paxos" or "Paxos protocol" can refer to a protocol that aims to reach consensus among a set of agents, including, proposers, acceptors and learners. In accordance with embodiments of the present invention, the protocol can be used for each transaction in a globally serialized order, that is, a consensus should be made on the order of transactions to be executed. Replicas sharing a common view of transaction order is equivalent to replicas making a consensus on how to place each transaction in the transaction order.

Embodiments of the present invention are described in connection with two fundamental types of system design, Execute-to-Order (ETO) and Order-to-Execute (OTE), which differ in how and when concurrent transactions are serialized.

As used herein, "Execute-To-Order (ETO)" systems can refer to systems that execute transactions to obtain an order. The transaction order is determined at a master replica during execution time (using dynamic locking to improve concurrency). Transaction execution results and their order are replicated among slave replicas such that the replicas can apply the execution results according to the order.

As used herein, "Order-To-Execute (OTE)" systems can refer to systems that decide on an order first and then execute transactions. Orders are determined by a consensus protocol before transactions are executed. The replicas are then notified of the transactions and their orders, and then execute the transactions accordingly.

Both types of systems use certain consensus protocol to ensure the replicas satisfy the consistency requirement. The difference is that ETO systems replicate the execution results to apply on the replicas, while OTE systems replicate the transactions to execute.

The three consensus protocol schemes discussed herein are all variations of the Paxos protocol. In connection with the description of the three schemes, complex algorithmic details in the Paxos protocol are abstracted away, and behaviors that are related to performance analysis in conjunction with the embodiments of the present invention are presented.

In the consensus protocols, for each slot in a global transaction order, proposers propose to place a transaction in that slot (e.g., executing $T_a$ as the 10th transaction). Acceptors accept the placement for each slot. Learners learn the transactions and their orders that are agreed upon by a quorum (majority) of acceptors. There could be one or multiple proposer(s) depending on the specific scheme, while each replica has one acceptor and one learner.

As used herein, "Single Leader Paxos or Single Leader Multi Paxos (SP)" can refer to a consensus protocol where orders are proposed by a single leader and propagated to other nodes using Paxos protocol. SP is an optimization of the classic Paxos by employing only one leading proposer for every slot in the transaction order. The behavior of the protocol collapses into a simple form: the leading proposer receives a new transaction; it then sends an accept request to acceptors for the transaction to be placed in the next slot in the order; acceptors accept the transaction for that slot and send back accepted responses to the learners; learners learn the responses and replicas can proceed to the execution.

The SP protocol costs two times the cross-datacenter latency (a message chain from proposer to acceptors and acceptors to learners). However, if the leader is in a data-center different from the client location, an extra cross-datacenter message delay is needed, which makes the delay three times the cross-datacenter latency. The reorder overhead can cause extra delay in OTE systems as well.

As used herein, "Fast Paxos (FP)" can refer to a consensus protocol where orders are proposed by any node and coordinated by a single leader upon conflict. One attempt to optimize for SP is to eliminate the extra cross-datacenter message delay resulted from the location difference between client and the single leader.

For each slot in the order, FP allows multiple proposers to send accept requests when they receive new transactions. Acceptors accept the first request and forward the accepted decision to learners. When a learner receives messages from a quorum of acceptors accepting the same transaction for a slot, the transaction is learned and agreed upon for that slot. It is possible that learners receive multiple transactions for one slot. Such a case is termed collision. Collisions can be recovered by having a coordinator to decide the transaction for that slot.

FP typically costs two times the cross-datacenter latency. When multiple proposers attempt to propose different transactions for the same slot around the same time, one of the proposals will succeed and be learned as the transaction for that slot. Other proposals will fail and the failed proposer proposes for the next slot. This results in two kinds of extra delay in the protocol response time: one is that a proposal can fail and restart multiple times before it is learned; another is that the successful proposal will also incur a delay due to collision described above.

Therefore, the cost of the FP protocol is two times the cross-datacenter latency for non-conflict cases, but incurs extra delay for multiple failed attempts and for collision recovery. OTE systems also have the extra reorder overhead.

As used herein, "Epoch-based Paxos (EP)" can refer to a consensus protocol where orders are proposed periodically and coordinated by all nodes. The additional costs in previous schemes result from (1) the distance between client and leader in SP; and (2) the conflict of proposals from multiple proposers on one slot in the transaction order in FP. One solution to eliminate both additional costs is to have different leading proposers for each slot, whereby each replica has proposers such that a client can always send requests to a local proposer, and each proposer is responsible for a non-overlapped set of slots in the transaction order. For example, the proposer on replica 0 proposes for the 0th, 5th, 10th, . . . slots, if there are 5 total replicas. Such a scheme can avoid conflicting proposals and remote messages from client to a proposer as well.

Such a scheme, however, may still be unsatisfactory for OTE systems because of the reorder overhead. Imagine an unbalanced workload where replica 0 never receives a client request. Under such circumstances, the transaction for the 0th slot in the global order is never proposed (because the proposer on replica 0 owns that slot). Because execution in OTE systems must follow the order, all the other transactions will be stalled waiting for the 0th transaction to arrive.

To alleviate this problem, an epoch-based protocol can be adopted. Replica local time is divided into epochs (small fixed length of time pieces). Proposers on each replica propose a batch of transactions for the assigned slot. A batch contains all the client requests arrived in the last epoch. A batch containing one empty transaction is proposed if no client request is received in the last epoch. Using this method, an underloaded proposer will not block the execution of other transactions indefinitely.

The performance cost for the EP protocol is approximately two times the cross-datacenter latency, however, it incurs extra delay resulted from waiting time until epoch end and a reorder overhead from both network latency variance and time drift among replicas.

As used herein, "workload arrival rate" can refer to transaction arrival rate.

As used herein, "low-level delay distribution" can refer to all probabilities that are inputs except in the ones defined in connection with the EP protocol.

As used herein, "time synchronization distribution" can refer to other probabilities that are needed as input in connection with the EP protocol.

To simplify a modeling analysis, the transaction execution and the consensus protocol can be decoupled. The execution models analyze the trade-off between ETO and OTE execution. They give insights on the impact of longer lock holding time and lower concurrency degree in both systems. Analytical methods can then be developed to study the trade-offs among the three consensus protocol schemes. The analyses are subsequently combined to analyze the two systems.

Models of ETO and OTE Execution

The transaction execution in both types of systems are modeled by a closed system with a fixed number of transactions, denoted by m. Transactions in the system are assumed to be of the same size, denoted by k, which is the number of locks of transaction requests. Transactions request locks are taken uniformly from a pool of d total locks. Locks are acquired in exclusive mode. Models with more general assumptions can be extended from such a basic model. For example, systems with different transaction sizes can be extended, and the effect of non-uniform access as well as shared locks is equivalent to the case of exclusive uniform access with a larger lock pool. To simplify the computation, it is assumed that lock conflict is rare (i.e., km=d). Each of the k steps in a transaction takes some processing time with mean value s. After acquiring all the locks the transaction commits which takes a mean time of c (for OTE systems, c=0). Table 1 lists the common variables used in the model.

TABLE 1

| | |
|---|---|
| d | Total number of locks |
| m | Number of concurrent transactions in the system |
| k | Number of locks acquired by each transaction |
| s | Mean time takes for each lock step |
| c | Mean time takes for commit step |

ETO System Execution Model

Following the assumptions stated above, transactions in ETO systems go through a fixed number of steps. In each step, a transaction acquires a lock. The transaction waits if the requested lock is held by another transaction. Transactions restart when a conflict is observed (that a requested lock has been acquired by another transaction). After acquiring all the locks, the transaction takes a commit step (while holding the locks) which invokes the consensus protocol.

The mean response time $res_{ETO,exec}$ can be calculated $$res_{ETO,exec}=ks+c+p_s kwW_s+W_d >> ks+c+p_s kwW_s \quad (1)$$

where ks+c is the time it takes if the transaction is running alone; $p_s$ is the probability the transaction is blocked for each step; $W_s$ is the average waiting time for each step if a transaction is blocked; $p_s kwW$ is the average blocking time for a transaction; $W_d$ is the overhead of restart because of deadlocks which is ignored when lock conflict is rare.

The probability of lock conflict can be approximated by $$p_s \approx \frac{(m-1)\overline{L}}{d} \quad (2)$$

where $\overline{L}$ is the mean number of locks held by a transaction. The probability that an active transaction is in its $j^{th}$ stage is proportional to the processing time of that stage (e.g., when commit time is long, the system tends to find a transaction in its commit stage). Therefore, the average number of locks an active transaction holds is $$L_a = \sum_{j=1}^{k} j \frac{1}{k+\frac{c}{s}} + \frac{1}{k+\frac{c}{s}}.$$

Under the assumption that lock conflicts are rare, the mean number of locks of active transactions can be used to approximate the number of locks of the system, that is, $L \gg L_a$. $W_s$ is the waiting time when a transaction is blocked by another. Blocked transactions form a waits for graph where nodes represent transactions and edges represent the waits-for relationship. Because only exclusive locks are considered, the graph is a forest of trees (no cycles). Active transactions are at the roots of the trees and designated to be at level zero. Transactions blocked by active transactions are at level one and so on. To compute $W_s$, $W_1$, the waiting time of level one transactions that are blocked by an active transaction, is computed first. Assume that the probability, $p_{b,j}$, that an active transaction is at its $j^{th}$ step when a level one transaction is blocked by it, is proportional to the number of locks that the active transaction holds and the mean time it remains in that state. Then, the probability is computed as $$p_{b,j} = \frac{js + (j-1)u}{\text{norm}},$$

where $u = p_s W_s$ is the average total waiting time of a transaction, and norm is a normalization factor. The probability that the active transaction is in its commit stage is $$p_{b,c} = \frac{kc}{\text{norm}}.$$

The normalization factor is $$\text{norm} = \sum_{j=1}^{k} [js + (j-1)u] + c.$$

The variable u is unknown and can be ignored under the rare lock conflict assumption since $u = s$. The waiting time $W_1$ is then the time for the active transaction to finish, which can be computed as $$W_1 = \sum_{j=1}^{k} [s' + (k-j)s + c] p_{b,j} + c' p_{p,c},;$$

where s' is the average residual time of each lock step and c' the commit step. From renewal theory, the mean residual time per lock step $$s' = \frac{s_s^2 + s^2}{2s}$$

and the commit step $$c' = \frac{s_c^2 + c^2}{2c}.$$

For fixed distribution, $$s' = \frac{s}{2}, c' = \frac{c}{2};$$

for exponential distribution, $s' = s, c' = c$.

To compute $W_s$ from $W_1$, the probability that a transaction is blocked b is introduced.

$$b = \frac{m - m_a}{m} \gg \frac{k p_s W_s}{res_{ETO,exec}}, \quad (3)$$

where $m_a$ denotes the mean number of active transactions in the system. The second equality follows Little's Law, i.e., b can be also expressed as a ratio of the mean transaction delay in the blocked state and the mean transaction response time. The probability that a transaction is at level i is approximated by $P_b(i) = b^{i-1}$, $i > 1$, and $P_b(1) = 1 - b - b^2 - \ldots$. The mean waiting time at level $i > 1$ is approximated by $W_i = (i - 0.5) W_1$. Therefore, the waiting time $W_s$ is a weighted sum of delays of all levels.

$$W_s \gg W_1 \left[ 1 - \sum_{i \geq 1} b^i + \sum_{i > 1} (i - 0.5) b^{i-1} \right] \quad (4)$$

The probability that a level one transaction is blocked is $$a = \frac{k p_s W_1}{res_{ETO,exec}} \gg \frac{k p_s W_1}{(k+g)s + k p_s W_1}.$$

Because b is unknown, a is good approximation of b (i.e., $b \gg a$) since most blocked transactions are at level one when conflict rate is low.

OTE System Execution Model

For OTE systems, before execution, transactions start lock acquisition in the order of their arrival. A transaction is blocked when a requested lock is held by an earlier transaction. Blocked transactions are appended in the first in, first out (FIFO) queues associated with the requested locks. Locks released by committed transactions are granted to the next transaction in its queue. Transactions successfully acquiring all the locks become active and start execution.

The mean response time of a transaction is the time the transaction originally takes plus the waiting time in the lock FIFO queue. That is, $$res_{OTE,exec} = ks + c + p_t W_t = ks + p_t W_t, \quad (5)$$

where $ks + c$ is the time it takes if the transaction is running alone. The commit time is ignored, i.e., $c = 0$, since consensus protocol is invoked before execution. $p_t$ is the probability that a transaction is blocked during lock acquisition. $W_t$ is the average waiting time on the queue.

The probability that a new transaction will be blocked by the previous $m - 1$ transactions can be approximated as $$p_t \gg 1 - \left( \frac{d - (m-1)k}{d} \right)^k, \quad (6)$$

under rare conflict assumption. The equation uses the fact that for each lock, the probability that the transaction does not conflict with the other $m - 1$ transactions can be approximated by $$\left( \frac{d - (m-1)k}{d} \right).$$

The probability that a transaction has a lock conflict with another transaction can be approximated using the same reasoning:

$$p_w \gg 1 - \left(\frac{d-k}{d}\right)^k.$$

The probability that the $i^{th}$ arrived transaction in the system is active equals the probability that the $i^{th}$ transaction does not conflict with the previous ones, which is $(1-p_w)^{i-1}$. Therefore, the average number of active transactions observed by the $m^{th}$ transaction is $$a = 1 + (1-p_w) + (1-p_w)^2 + \ldots + (1-p_w)^{m-2} = \frac{1-(1-p_w)^{m-1}}{p_w}.$$

The mean number of transactions an active transaction blocks is then $$h \gg 1 - \frac{m-1}{a},$$

which is also the mean number of transactions the $m^{th}$ transaction has to wait before execution given a conflict. Therefore, the waiting time of a blocked new transaction is $$W_t = r + (h-1)ks, \quad (7)$$

where $r \gg 0.5ks$ is the mean residual time of the active transaction and $(h-1)ks$ is the mean time to wait for the blocked transactions of higher levels to finish.

The probability that a transaction is blocked is $$b = \frac{m - m_a}{m} = \frac{p_t W_t}{res_{OTE,exec}}. \quad (8)$$

Models of Consensus Protocol Schemes

Response time of consensus protocols are discussed herein. It is assumed in this disclosure that the cross-datacenter network delays are random variables that are independent and identically following the same distribution. The local network latency is small enough to be ignored. The arrivals of client requests on all data center follow Poisson process with the same arrival rate l. The performance of the protocols is analyzed under normal cases. Embodiments of the invention described herein do not consider node failure and recovery since node faults are usually rare cases and the performance of many recovery schemes, such as leader reselection, mainly depend on the implementation detail.

It is to be understood, that the embodiments are not necessarily limited to the methods for calculating protocol response time discussed herein, and other methods of calculating protocol response time can be used.

Throughout the derivation, L is used to denote the random variable of cross datacenter node-to-node latency, $F_L(t) = Pr(L \pounds t)$ is the probability distribution of L, and $f_L(t)$ is the density function. n is used to denote the number of datacenters (e.g., nodes) of the system.

Referring to FIG. 1A, the SP protocol functions as follows. A client sends a request to a single leader. The leader orders requests and sends a request pair, including an order number and request, to acceptors. Upon receiving a request pair, the acceptors send messages to learners, which learn the pair when a quorum of acceptor messages is received. For the SP consensus protocol, the estimated protocol-level delay $T_p$ is computed as:

$$T_p = OD(T_r, \text{Poisson}(\lambda)) + \text{cond}(1/n, 0, L), \quad (9)$$

where $\lambda$ is a workload arrival rate and $$T_r = Q(n, f, L), \quad (10)$$

where $f = [n/2] - 1$, L is a network latency and n is the number of nodes in the distributed computing system.

Figure 1B:
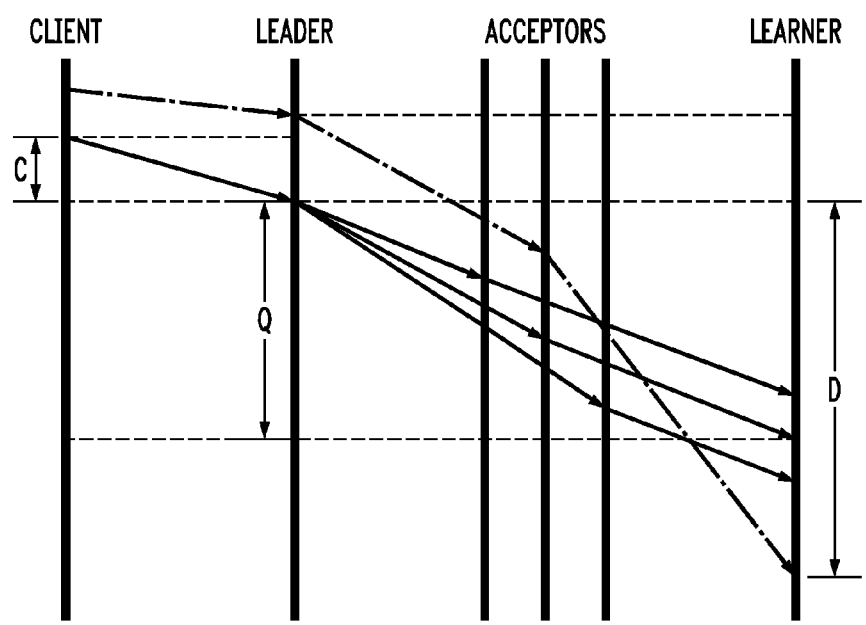
FIG. 1B is a diagram illustrating operation of an SP protocol, according to an exemplary embodiment of the invention.

Referring to FIG. 1B, in connection with the SP protocol: (1) a client sends a transaction to the leader node; and (2) the proposer on that node starts the protocol. The proposer proposes the transaction for the next slot and sends messages to acceptors on all the nodes. The acceptors send messages to the learners on each node. The learner learns the transaction for the next slot when it receives messages from a quorum of acceptors.

Both ETO and OTE systems can use the SP protocol, but differ when transactions are executed. In ETO systems, transactions are executed after the leader node receives the transaction from a client in step (1) and before continuing to step (2). In OTE systems, the transaction is executed after step (2), when the learner learns the transaction as well as all the transactions of previous slots. The delay in step (1), denoted C, equals to the node-to-node latency L if the client and the leader node is in different region or zero if they are in the same region. If it is assumed that the client load is balanced across regions, then the probability that a client in the same region as the leader node is $$\frac{1}{n}.$$

Therefore, the distribution of the delay C is $$F_C(t) = Pr(C \pounds t) = \frac{1}{n} + \frac{n-1}{n} F_L(t), \text{ and} \quad (11)$$

$$E[C] = \frac{n-1}{n} E(L).$$

To compute the delay, Q, in step (2) (termed quorum delay), a round trip delay random variable $R = L_i + L_j$ is introduced to denote the time of the message chain from proposer to an acceptor, then to a learner, which is the summation of two iid node-to-node delays. The probability density function of R is $$f_R(t) = \int_0^t f_L(u) f_L(t-u) du.$$

The learner learns a transaction when it receives $$q = \frac{n+1}{2}$$

messages from a majority (quorum) of acceptors. Given that one of the message chains is local and can be ignored (the proposer, acceptor and learner are all in the same data center), the quorum delay in step (2) equals the value of the $(q-1)^{th}$ smallest of n-1 iid round trip delay random variables.

$$F_Q(t) = \sum_{j=q-1}^{n-1} \binom{n-1}{j} F_R^j(t)(1-F_R(t))^{n-j-1} \quad (12)$$

For ETO systems, step (2) is what a transaction does in the commit step and thus the probability distribution $F_Q(t)$ (specifically, the first two moments of the distribution) is used in the execution model for the mean commit processing time c and its variance.

For OTE systems, the computation should include the reorder overhead as well. The delay including the reorder overhead, denoted by D, is the time between the proposer proposing a transaction $T_i$ and the learner learning both the transaction and all the previous transactions. To compute the distribution of D from $F_Q(t)$, the probability $F_D(t)=(D£t)$ can be computed by first obtaining the conditioned probability, Pr(D£t|s), given that the time the transaction $T_i$ is proposed is s and then letting s→¥. The conditioned probability can be computed as Pr(D£t|s)=Pr(X)Pr(Y|s), where X is the event that $T_i$ is learned in a time less than t; and Y is the event that all other previous transactions are learned before s+t. The probability Pr(X)=Pr(Q£t)=$F_Q(t)$ by definition. To derive Pr(Y|s), consider the i transactions that are proposed before transaction $T_i$. Each of those transactions has to be learned before s+t, and thus a transaction proposed at time u can only have a quorum delay less than s+t−u, i.e., Q£s+t−u. Given that the transaction arrivals follow a Poisson distribution, the time these i transactions are proposed is independent and uniformly distributed in [0,s]. By unconditioning on u and summing over i, $$Pr(Y|s) = \sum_{i=0}^{¥} \frac{(ls)^i}{i!} e^{-ls} \left[\int_0^s \frac{F_Q(s+t-u)}{s} du\right]^i = e^{-l}\int_t^{t+s}(1-F_Q(u))du$$

can be obtained. Therefore, the delay including the reorder overhead D is $$F_D(t) = Pr(D£t) = FQ(t)e^{-l\int_t^{¥}(1-FQ[u])du} \quad (13)$$

The mean response time of the consensus protocol for OTE systems can be calculated as:

$$res_{sp} = E(C) + E(D) \quad (14)$$

Figure 2A:
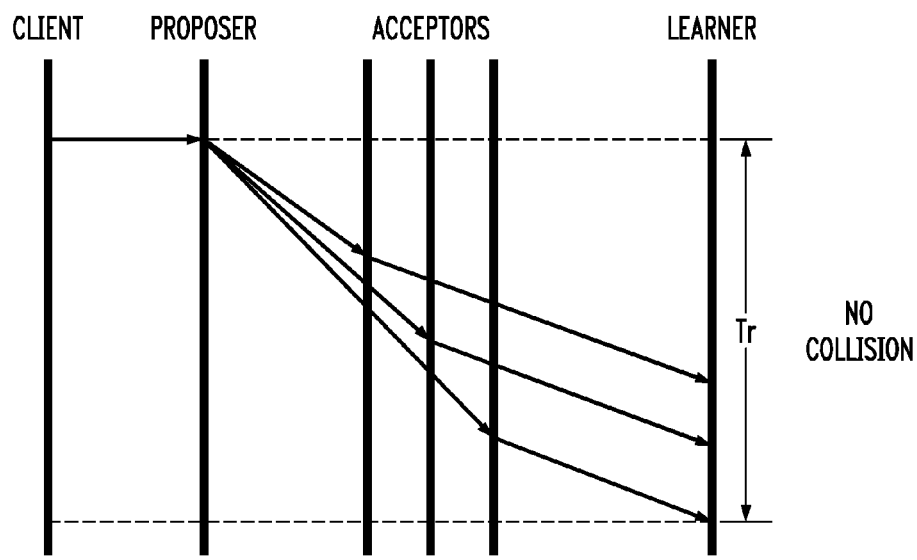
FIGS. 2A and 2B are diagrams illustrating operation of an FP protocol, according to an exemplary embodiment of the invention.
Figure 2B:
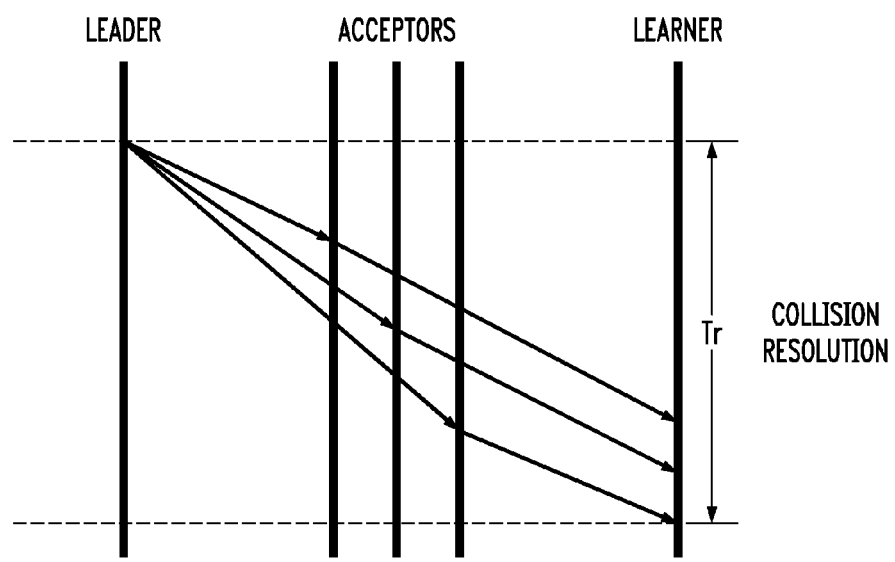

Referring to FIGS. 2A and 2B, the FP protocol functions as follows. A client sends a request to local proposer. The local proposer sends a request pair, including an order number and request, to all acceptors. If a leader detects that no quorum can be formed, there is a collision. Upon collision, the leader starts a new round and acts as in a SP protocol. For the FP consensus protocol, the estimated protocol-level delay $T_p$ is computed as:

$$T_p = OD(T_l, \text{Poisson}(\lambda)), \quad (15)$$

where λ is a workload arrival rate and $$T_l = \text{cond}(p_c, T_r + T_r, T_r) \quad (16)$$

$$T_r = Q(n, f, L), \quad (17)$$

where f=[n/3]−1, L is a network latency, $p_c$ is a collision probability, and n is the number of nodes in the distributed computing system.

In accordance with an embodiment of the present invention, the way FP works is similar to that of SP, except that there are multiple proposers proposing transactions for the same slots. Proposals of the same slot cause extra delays during replication in addition to the reorder overhead. The extra delay has two parts: (1) a proposal for a slot fails and new slots are proposed until success; (2) in case of a successful proposal, a proposal collision adds the delay of an extra message. Therefore, the response time of the FP can be expressed as $res_{fp} = t_{fail} + t_{succ} + t_{reorder}$. Here $t_{fail}$ is the mean time from when a proposer proposes for a slot until the last failed proposal finishes; $t_{succ}$ is the mean time for the successful and the last proposal of a slot. A successful proposal takes the time of a quorum delay computed by Eq. 12 when there is no collision. It takes an extra quorum delay for a coordinator to resolve the collision if there is one. Therefore, $t_{succ} = E(Q)(1+Pr(\text{collision}))$. From simulation, the impact of collision was found to be insignificant compared to the impact of failed attempts. Hence, $t_{succ}$ can be approximated by $t_{succ} \gg E(Q)$. Furthermore, the reorder overhead is also negligible compared to the delay of failed attempts.

In accordance with an embodiment of the present invention, to compute the proposal delay, the simplification can be made that the network latency is constant. Under this assumption, if there is only one proposal, it is learned after a quorum delay (previously calculated in Eq. 12) which assumes to be a fixed interval. If there are multiple proposals competing for a slot, there will be failed proposals which will restart and reach the acceptors at the same time when competing for the next slot; one of the restarted proposals will be learned, leave the competition and move onto execution. Such a mechanism can be modeled as an M/D/1 queue where proposals arrive following a Poisson process and one proposal can leave the system after a fixed amount of time. The constant network latency approximation simplifies competition process, and therefore, the model is more accurate when the load is relatively low.

Since the system is simplified into an M/D/1 queue, the Pollaczek-Khinchine formula can be applied. The number of proposals in the system in steady state is therefore $$N = lE(Q) + \frac{(lE(Q))^2}{2(1-lE(Q))}.$$

The average delay can be calculated using Little's Law:

$$res_{fp} = \frac{N}{l}. \quad (18)$$

Figure 3A:
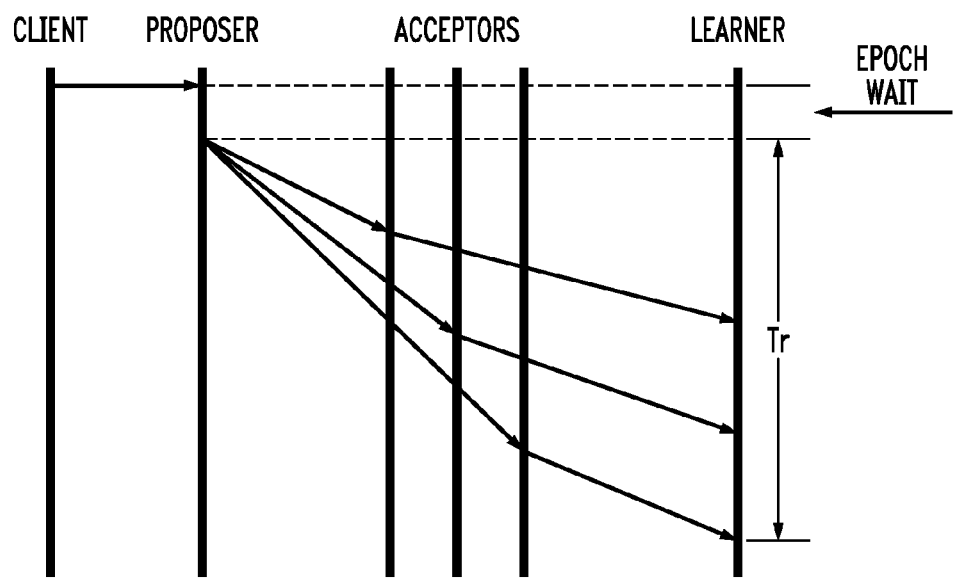
FIGS. 3A, 3B and 3C are diagrams illustrating operation of an EP protocol, according to an exemplary embodiment of the invention.
Figure 3B:
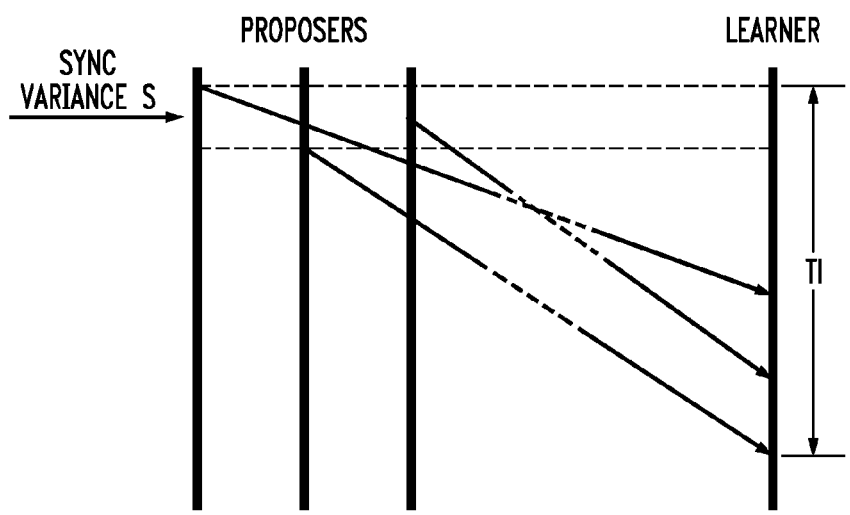
Figure 3C:
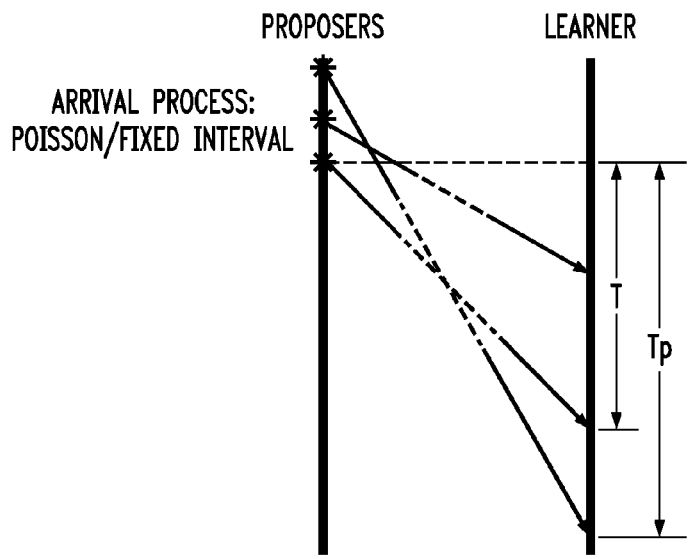

Referring to FIGS. 3A, 3B and 3C, the EP protocol functions as follows. A client sends a request to local proposer. Local proposers send request pairs, including epochID:nodeID, request, periodically to acceptors. A learner learns the epochID, requests when receiving all quorums of epochID:nodeID, requests from all local proposers. Referring to FIG. 3C, the learner cannot process a learned pair until it has learned all pairs ordered before that pair. This out-of-order delay should be included in the protocol latency.

For the EP consensus protocol, the estimated protocol-level delay $T_p$ is computed as:

$$T_p = W + OD(T_e, \text{Fixed}(e)), \quad (19)$$

where $$T_e = \max_n(T_l) \quad (20)$$

$$T_l = T_r + S \quad (21)$$

$$Tr = Q(n, f, L), \quad (22)$$

where f=[n/2]−1, L is a network latency, W is an epoch wait time, S is a time synchronization difference, and n is the number of nodes in the distributed computing system.

Figure 3D:
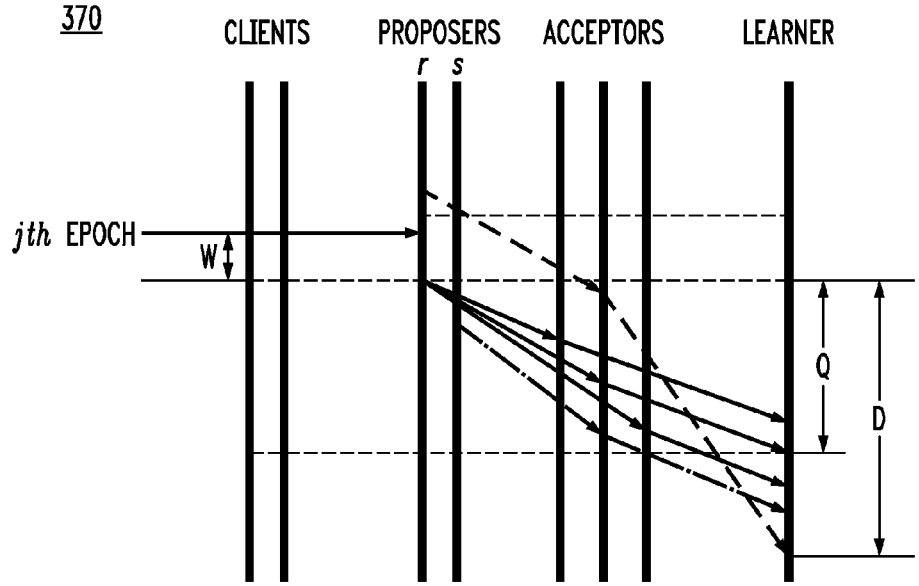
FIG. 3D is a diagram illustrating operation of an EP protocol, according to an exemplary embodiment of the invention.

Referring to FIG. 3D, the EP protocol includes three steps: (1) the client sends a transaction to the local proposer and is batched for the beginning of the next epoch; (2) the local proposer proposes for the next slot assigned for the starting epoch and begins the message chains among acceptors and learners; and (3) a learner must learn all the batches of previous slots before the next batch can begin execution. The local proposer, acceptors and learners in step (2) behave exactly as in the SP protocol; each proposer proposes a unique slot for the batch (identified by the proposer ID and epoch ID). Therefore, no collisions or restarts, such as in the case of FP, will occur. Step (3) incurs a reorder overhead for OTE systems similar to the SP protocol.

The response time of the protocol is the summation of W, the waiting time for an epoch to start in step (1), and D, the delay for steps (2) and (3) including the quorum delay and the reorder overhead. The average waiting time E(W) is computed first. Following the property of Poisson arrivals, given that there are i transactions sent by the clients to a local node on a period [0,e], the arrivals of i transactions are independent and uniformly distributed over the period. For each transaction r, given i, the waiting time is then $$E(W_r \mid i) = \frac{e}{2}.$$

Because the arrivals of these i transactions are independent, the waiting time is then $$E(W \mid i) = \frac{e}{2}.$$

By summing over all i, we get $$E(W) = \sum_{i=1}^{\yen} Pr(i)\frac{e}{2} = \frac{e}{2} \quad (23)$$

The distribution of the time between a proposer proposing a transaction batch for a slot of the batch and a learner learning the transaction batch, denoted Q, is computed the same as Eq. 12. Next the delay of step (2) and (3) is computed, denoted D, which is the time between a when transaction batch is proposed and the batch can be executed, including both quorum delay Q and reorder overhead. Each transaction batch is identified by a tuple (i,j) from node i and the $j^{th}$ epoch. Consider the delay $D_{I,J}$ of a transaction batch starting at time Je. The event $D_{I,J} £ t$ is equivalent to the learner learning all the transaction batches (i,j) where, i=1, 2, . . . n and j£J before Je+t. The probability that the learner learns all the transaction batches for j=J is $Pr(B_J £ t)=F_Q^n(t)$; and $Pr(B_{J-1} £ t)=F_Q^n$ (Je+t−(J−1)e)=$F_Q^n$(t+e); and so on. Therefore, the distribution of the delay for epoch J, $D_J$ can be computed as $$Pr(D_J £ t) = \prod_{j=0}^{J} F_Q^n(t + je).$$

By letting J→¥, the distribution of the delay of step (2) and (3), $$F_D(t) = PR(D £ t) = \prod_{j=0}^{\yen} F_Q^n(t + je),$$

can be obtained. Furthermore, the time drift among the nodes is taken into account. To simplify computation, it is assumed that the time differences between the epoch start times on any two nodes are random variables, denoted S, that are independent and identically following the distribution $F_s(t)$. Let $Q'=Q+S$ denote the delay between the time of batch proposal and the time of its arrival at a learner taking the time drift between the node of the proposer and that of the learner into account. The probability of the delay D becomes $$F_D(t) = PR(D £ t) = \sum_{j=0}^{\yen} F_{Q'}(t + je)F_Q^{(n-1)}(t + je). \quad (24)$$

The average response time of EP is $$res_{ep} = E(W) - E(D) \quad (25)$$

Combined System Models

For ETO systems, when transactions commit during execution, the consensus protocol is invoked, therefore the total response time is the response time of the execution model with the protocol response time as an input variable.

$$res_{ETO} = E(C) + res_{ETO,exec}(Q). \quad (26)$$

where C is the delay for a request to be sent from client to the leader in SP and is computed using Eq. 11; and Q is the quorum delay random variable following the distribution computed in Eq. 12, the distribution is treated as an input for the execution model but only the first two moments are needed; $res_{ETO,exec}$ is computed using Eq. 1.

For OTE systems, the consensus protocol is decoupled from transaction execution, therefore the response time is the summation of the execution and protocol response times:

$$res_{OTE} = res_p + res_{OTE,exec}. \quad (27)$$

where $res_p$ is the latency of the consensus protocol latency which is computed using Eq. 14, Eq. 18 or Eq. 25 depending on the scheme; $res_{OTE,exec}$ is computed using Eq. 5.

If the system is a closed system with the concurrent number of transactions m, the execution time $res_{ETO,exec}$ and $res_{ETO,exec}$ can be readily computed. If the system is an open system with arrival rate l, an iterative method is required to compute the response time. Using Little's law, the initial value of the number of transactions in the system m can be approximated as $m_0=l\ (ks+c)$. For each iteration the response time can be computed using Eq. 26 and Eq. 27 and the number of transactions for the next iteration is $$m_i = \lfloor l\ res_{i-1} \rfloor. \quad (28)$$

ETO and OTE systems can be compared for response time under Poisson arrival process and maximum throughput with a fixed number of transactions.

Figure 4:
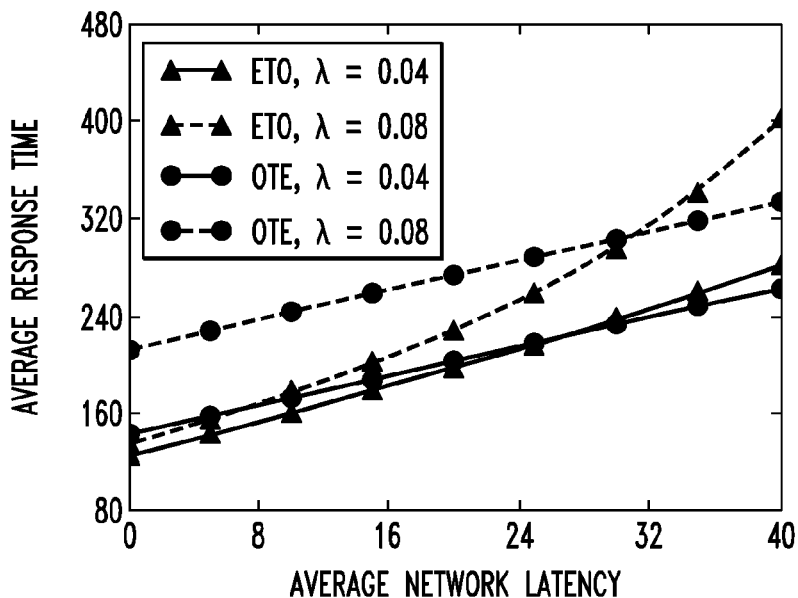
FIG. 4 is graph illustrating impact of arrival rate 2 and average network latency on execution time for two system types, according to an exemplary embodiment of the invention.

OTE systems exhibit lower concurrency degree; ETO systems, on the other hand, have longer lock holding time due to the fact that the consensus protocol must be invoked before commit FIG. 4 compares the performance of the two systems when both work under an open system with arrival rate l and assuming network latency is constant. When the network latency is low, the transaction execution of ETO systems has a lower response time; the difference between the two systems increases with arrival rate l. When increasing the network latency, the response time of ETO execution has a super linear growth. In fact, if the model is further approximated with $m=l(ks+c)$, k? 1,s? u, and $W_l \gg W_s$, the ETO system model can be simplified into $$res_{ETO} \approx \frac{lk^2}{d}cc' + \left(\frac{lk^2}{2d}+1\right)c + \frac{lk^4s^2}{6d} + ks$$

where c is average commit time and c' is the residual time of the commit step (i.e., the quorum delay). For fixed distribution $c'=0.5c$, and for exponential distribution $c'=c$. When both c and c' are large, the ETO system suffers long response time. On the other hand, for OTE system model, if the model is further approximated using $m=l\ ks$, and k? 1, and d? $k^2$, the model can be simplified into $$res_{OTE,} \approx \frac{2lk^4s^2}{2d-lk^3s}+ks.$$

Therefore, when $l\ k^3s=2d$, the response time grows linearly with l, but once l is large enough, it has a much larger effect on response time.

Figure 5:
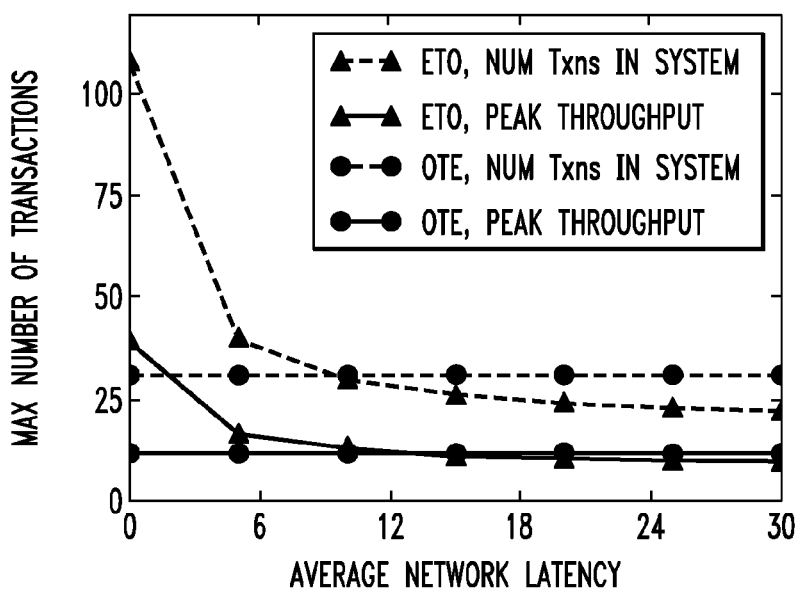
FIG. 5 is graph illustrating impact of average network latency on maximum throughput for two system types, according to an exemplary embodiment of the invention.
Figure 6:
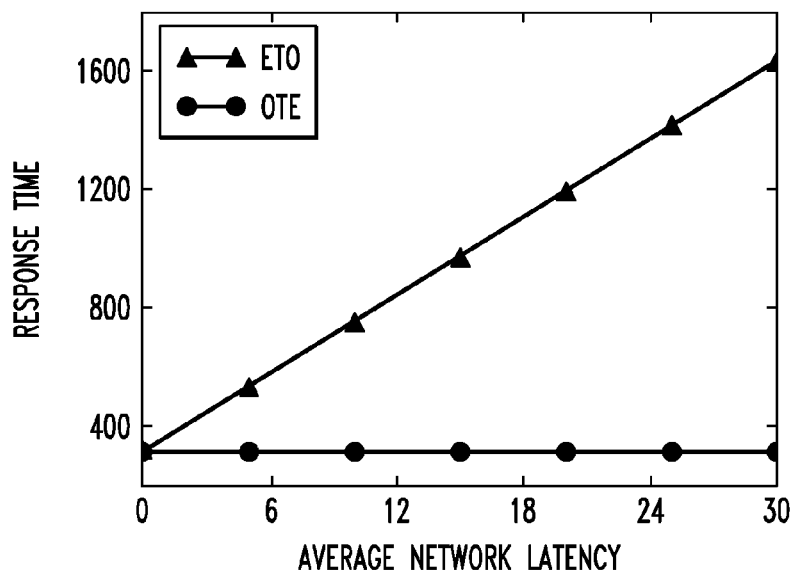
FIG. 6 is graph illustrating impact of average network latency on execution time under maximum throughput for two system types, according to an exemplary embodiment of the invention.

If maximizing the throughput of the system is the aim, the model can find the peak throughput by maximizing the active number of transactions $(1-b)m$ (b is the probability a transaction is blocked, see Eq. 3 and Eq. 8) when increasing the number of transactions m. FIG. 5 demonstrates the impact of network latency on peak system throughput and the number of concurrent transactions. When network latency is low, ETO systems can obtain much higher throughput than OTE systems (e.g., more than three times when network latency is negligible). However, the peak throughput decreases drastically when network latency increases for ETO systems. The increase of network latency has no observable impact on the peak throughput of OTE systems. FIG. 6 also shows the response time when the system is at peak throughput. ETO systems always have a longer response time than OTE systems in exchange for the higher throughput.

Next, the three schemes for the consensus protocol in OTE systems are compared with varying network latency variance and arrival rate. The impact of time drift for EP is also studies. The number of replicas is set to 5. The network latency distribution is set to a log-normal distribution with average latency 100, unless otherwise mentioned. The performance of FP and EP is studied using SP as a baseline.

Figure 7:
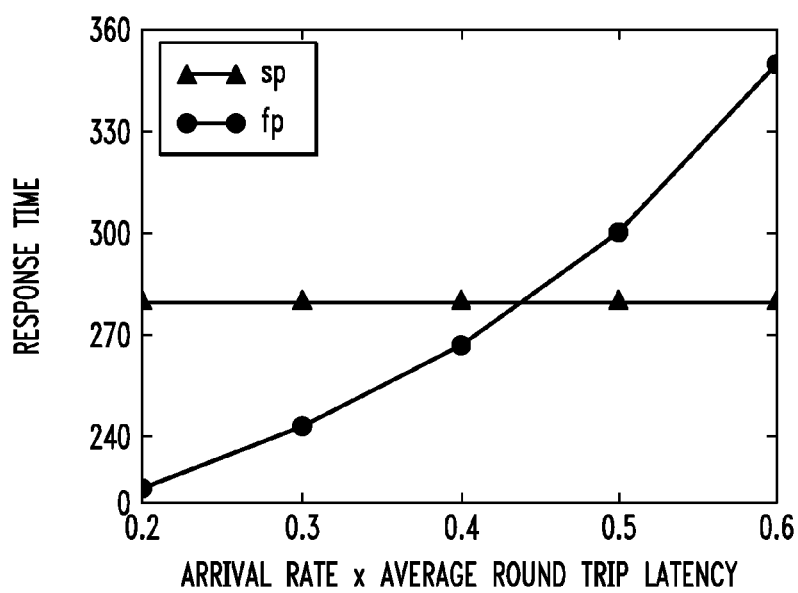
FIG. 7 is graph illustrating impact of load occupancy (arrival rate×average service time) on FP when compared with SP, according to an exemplary embodiment of the invention.

FIG. 7 demonstrates the impact of load occupancy (arrival rate×average service time) on FP when compared with SP. The network latency variance is set to 0 for fair comparison since the reorder overhead is ignored in the FP model. FIG. 7 shows that when the occupancy is low (less than 45%), it is more beneficial to use the FP protocol to save the extra cross-datacenter delay for the client to contact the leader. Since the model is an overestimation of the response time of FP, the threshold 45% is an underestimation, the real threshold can be larger when load is higher. The threshold can be analytically approximated by letting $E(L)=T$ and approximating $E(Q)=2T$. The threshold is the solution to $$\frac{N}{l} = 2lT + \frac{(2lT)^2}{2(1-2lT)} \pounds \left(2 + \frac{n-1}{n}\right)T,$$

where $$\frac{N}{l}$$

is me response time of FP from Eq. 18 and $$\left(2 + \frac{n-1}{n}\right)T$$

is an approximation of response time of SP from Eq. 14 without considering the reorder overhead. The result is $$lT = \frac{n-1}{2(2n-1)} \approx 25\%.$$

Figure 8:
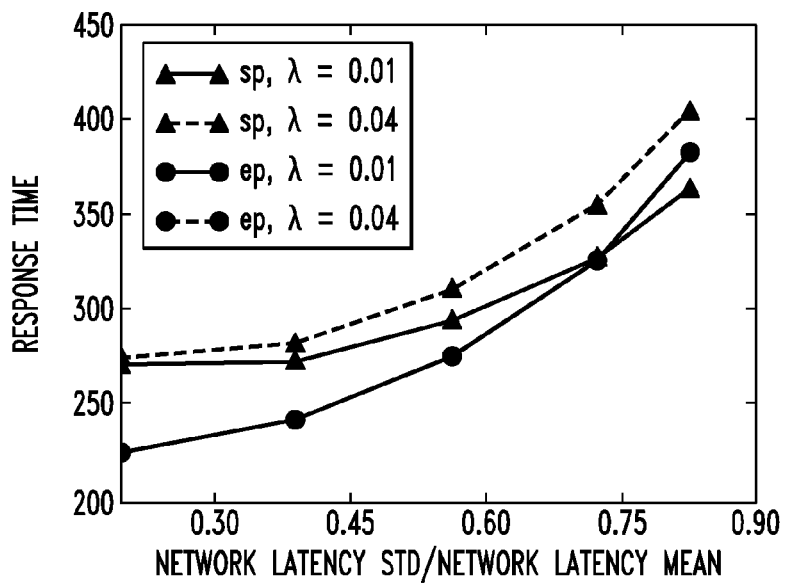
FIG. 8 is graph comparing SP and EP with varying arrival rate λ and network latency variance, according to an exemplary embodiment of the invention.

25%. The threshold is smaller than that in FIG. 7 because the reorder overhead in SP was ignored and $E(Q)$ was overestimated to 2T. On the other hand, a system with occupancy less than 25% might be better served using FP as the consensus protocol. FIG. 8 compares SP and EP with varying arrival rate l and network latency variance. As is shown in FIG. 8, both protocols have an increased response time when network latency variance increases. This result is due to the reorder overhead in the OTE systems. Furthermore, the network variance has a larger impact on EP than SP. Therefore, when the network latency has a large variance, EP is less attractive. On the other hand, it is also shown in FIG. 8 that arrival rate has an impact on Single Leader Paxos as well. This is again because of the impact of reorder overhead. When the arrival rate is large, there is a higher probability that a transaction with an earlier slot delays later ones. The arrival rate does not affect the EP protocol since slots are proposed periodically, which is independent of the arrival rate.

Figure 9:
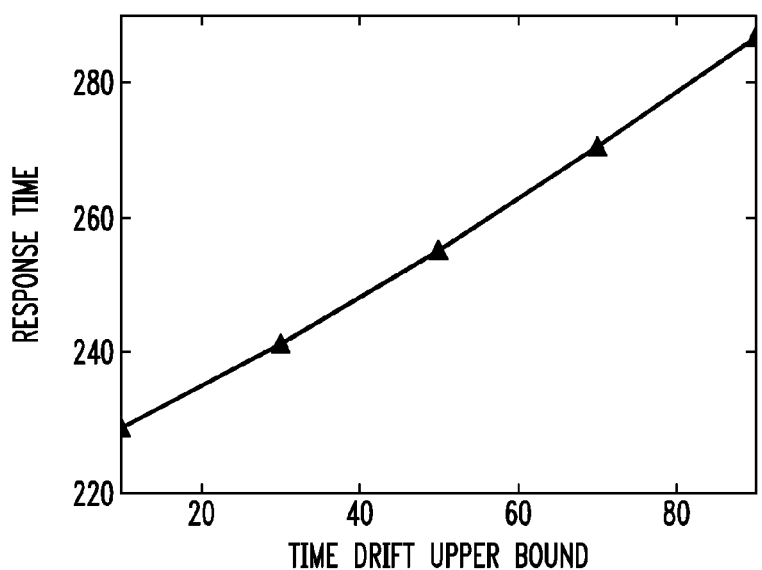
FIG. 9 is a graph illustrating impact of time drift on EP, according to an exemplary embodiment of the invention.

The impact of time drift among data centers on the response time of EP protocol can also be studied. Assuming the distribution of time drift across datacenters for each epoch is uniformly distributed from 0 to an upper bound, FIG. 9 shows that the response time increases linearly with the time drift upper bound. This suggests for EP to work properly, the time drift across data centers should be kept within a reasonable limit.

Figure 10:
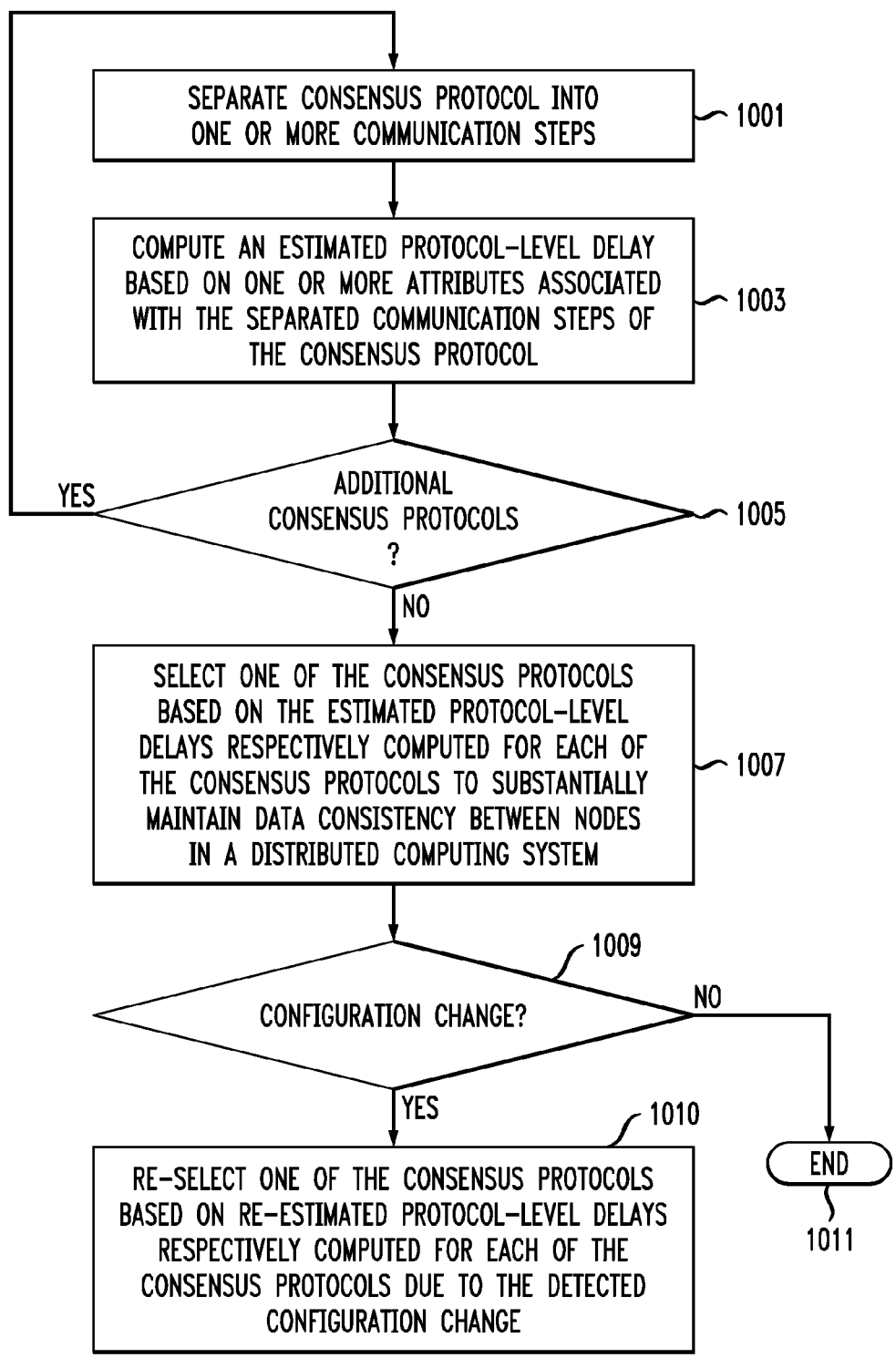
FIG. 10 is a flow diagram of a process for selecting a consensus protocol, according to an exemplary embodiment of the invention.
Figure 11:
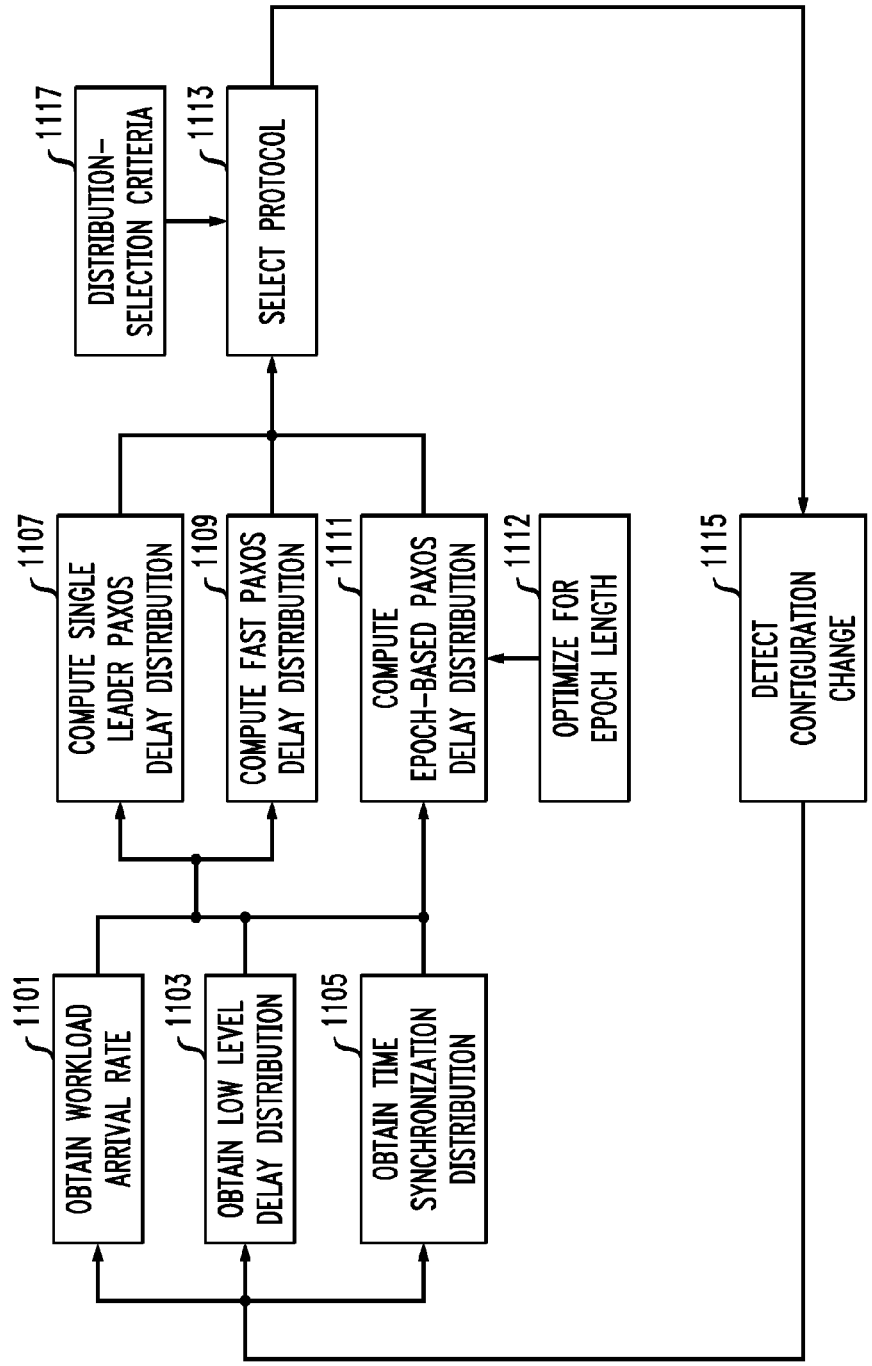
FIG. 11 is a flow diagram of a process for selecting a consensus protocol, according to an exemplary embodiment of the invention.

FIGS. 10 and 11 are flow diagrams of processes for selecting a consensus protocol, according to exemplary embodiments of the invention. Referring to FIG. 10, a method 1000 for selecting a consensus protocol, according to an exemplary embodiment of the invention, comprises separating a consensus protocol into one or more communication steps (block 1001). The consensus protocol may be, for example, an SP protocol, FP protocol or EP protocol. The consensus protocols are useable to substantially maintain data consistency between nodes in a distributed computing system. A communication step comprises a message transfer, attributable to the consensus protocol, and can include, for example, a message transfer a client and a leader, a client and a proposer, a leader and acceptors, a proposer and acceptors and acceptors and a learner.

The method 1000 further comprises computing an estimated protocol-level delay based on one or more attributes associated with the separated communication steps of the consensus protocol (block 1003). The method 1000 includes, at block 1005, determining whether there are remaining consensus protocols for which to separate into communication steps and compute an estimated protocol-level delay. If yes, the method returns to block 1001 until the estimated protocol-level delay is computed for each of the consensus protocols. Once it is determined that there are no more consensus protocols for which an estimated protocol-level delay is to be computed, the method 1000 proceeds to step 1007 where one of the consensus protocols (e.g., SP, FP or EP), is selected, based on the estimated protocol-level delays respectively computed for each of the consensus protocols, to substantially maintain data consistency between nodes in the distributed computing system. In accordance with an embodiment, the protocol with the lowest estimated protocol-level delay and/or highest throughput is selected.

Referring to FIG. 11, the attributes include input configurations of a workload, such as, for example, a synchronization delay 1105 attributable to out-of-order message delivery for nodes in the distributed computing system, a workload arrival rate 1101 for nodes in the distributed computing system, and/or a low-level delay 1103 for nodes in the distributed computing system. Also referring to FIG. 11, the computing of an estimated protocol-level delay for each consensus protocol is illustrated in blocks 1107, 1109 and 1111. In connection with computing the estimated protocol-level delay for the EP protocol, the epoch length is optimized (block 1112). In accordance with another embodiment, the performance of any of the consensus protocols can be improved based on at least one of the one or more attributes associated with separated communication steps of a given one of the protocols and one or more operating parameters of a given one of the protocols.

Referring back to FIG. 10, the method further includes, at block 1009, detecting a configuration change in the distributed computing system. A configuration change can include, for example, changes to workload network configurations. If there is a detected configuration change at block 1009, the method proceeds to block 1010, where one of the consensus protocols is re-selected to substantially maintain data consistency between nodes in the distributed computing system, the re-selection being based on re-estimated protocol-level delays respectively computed for the consensus protocols due to the detected configuration change in the distributed computing system. For example, the protocol with the lowest estimated protocol-level delay and/or highest throughput based on the detected configuration change is selected at block 1010. If there is no detected configuration change, the method 1000 proceeds to block 1111, where the process in ended, and the selected consensus protocol is implemented. Referring to FIG. 11, after selection of a protocol at block 1113, the feedback from detecting the configuration change 1115 to the input attributes 1101, 1103 and 1105 is shown.

Figure 12:
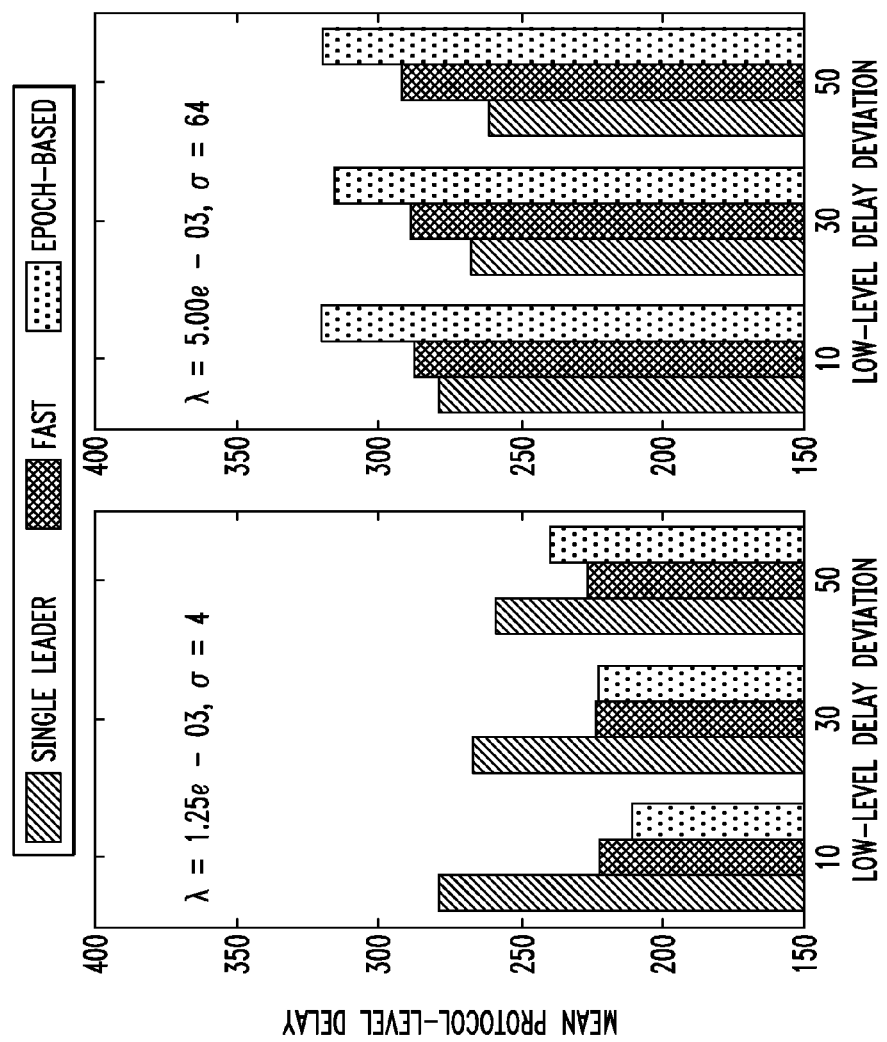
FIG. 12 illustrates graphs of mean protocol-level delay under various low-level deviations in connection with different arrival rates and time sync deviations among nodes, according to an exemplary embodiment of the invention.

Referring to FIGS. 11 and 12, in accordance with an embodiment of the present invention, a distribution selection criteria 1117 can be used when selecting a consensus protocol. FIG. 12 illustrates graphs of mean protocol-level delay under various low-level deviations in connection with different arrival rates and time sync deviations among nodes, according to an exemplary embodiment of the invention. As shown in FIG. 12, in an experimental example, mean protocol-level delay under various low-level deviations (x axis), arrival rate ($\lambda$) and time sync deviation among nodes ($\sigma$) can be compared. As can be seen in FIG. 12, FP benefits from low arrival rate and EP benefits from small low-level and time sync deviation. In the experimental example in FIG. 12, none of the protocols works best in all cases.

In connection with evaluating the performance of each consensus protocol, different calculations can be performed in accordance with embodiments of the present invention. For example, Y=cond(p, $X_1$, $X_2$), where $X_1$, $X_2$, Y are random variables and Y follows the distribution of $X_1$($X_2$) with probability p and (1−p) respectively.

Computing Y=cond(p, $X_1$, $X_2$):

$$f_Y(t)=pf_{X_1}(t)+(1-p)f_{X_2}(t) \qquad (29)$$

Y=Q(n, f, X), where n, f∈$\mathbb{N}$, f≤n and X is the random variable representing the network latency. Y is the latency random variable for a learner to receive the messages of a quorum of acceptors of size n−f.

Computing Y=Q(n, f, X):

$$R = X + X \qquad (30)$$

$$Y = cond\left(\frac{1}{n}, Q_c, (n-1, n-f-1, R), Q_r(n, n-f, X, R)\right) \qquad (31)$$

$$F_{Q_c}(n, m, R, t) = \sum_{j=m}^{n}\left[\binom{n}{j}F_R^j(t)(1-F_R(t))^{n-j}\right] \qquad (32)$$

$$F_{Q_r}(n, m, X, R, t) = \sum_{j=m}^{n}\left[F_X^2(t)\binom{n-2}{j-2}F_R^{j-2}(t)(1-F_R(t))^{n-j} + \right. \qquad (33)$$

$$2F_x(t)(1-F_x(t))\binom{n-2}{j-1}F_R^{j-1}(t)(1-F_R(t))^{n-j-1} +$$

$$\left. (1-F_x(t))^2\binom{n-2}{j}F_R^j(t)(1-F_R(t))^{n-j-2}\right]$$

Y=OD(X, a), where X is a random variable representing a latency delay and a is an arrival process of either Poisson or fixed interval. Y is the random variable including both the latency delay and the out-of-order delay with the arrival process.

Computing Y=OD(X, Fixed(e)):

$$F_Y(t)=\Sigma_{k=0}^{\infty}F_X(t+ke) \qquad (34)$$

Computing Y=OD(X, Poisson($\lambda$)):

$$F_Y(t)=F_X(t)^{-\lambda\cdot[\int_t^{\infty}(1-F_X(u))du]} \qquad (35)$$

FP collision probability:

$$p_c=\int_0^{\infty}\lambda e^{-\lambda t}(1-F_Q(t))dt \qquad (36)$$

EP epoch waiting time:

$$w(t) = \frac{1}{e}, 0 \le t \le e \quad (37)$$

In accordance with an embodiment of the present invention, the data consistency substantially maintained between nodes in a distributed computing system comprises an ETO data consistency or an OTE data consistency.

The nodes of the distributed computing system can respectively comprise data centers or servers. Accordingly, a node may be, for example, one data center in a multiple data center system, or one server in a multiple server system.

Figure 13:
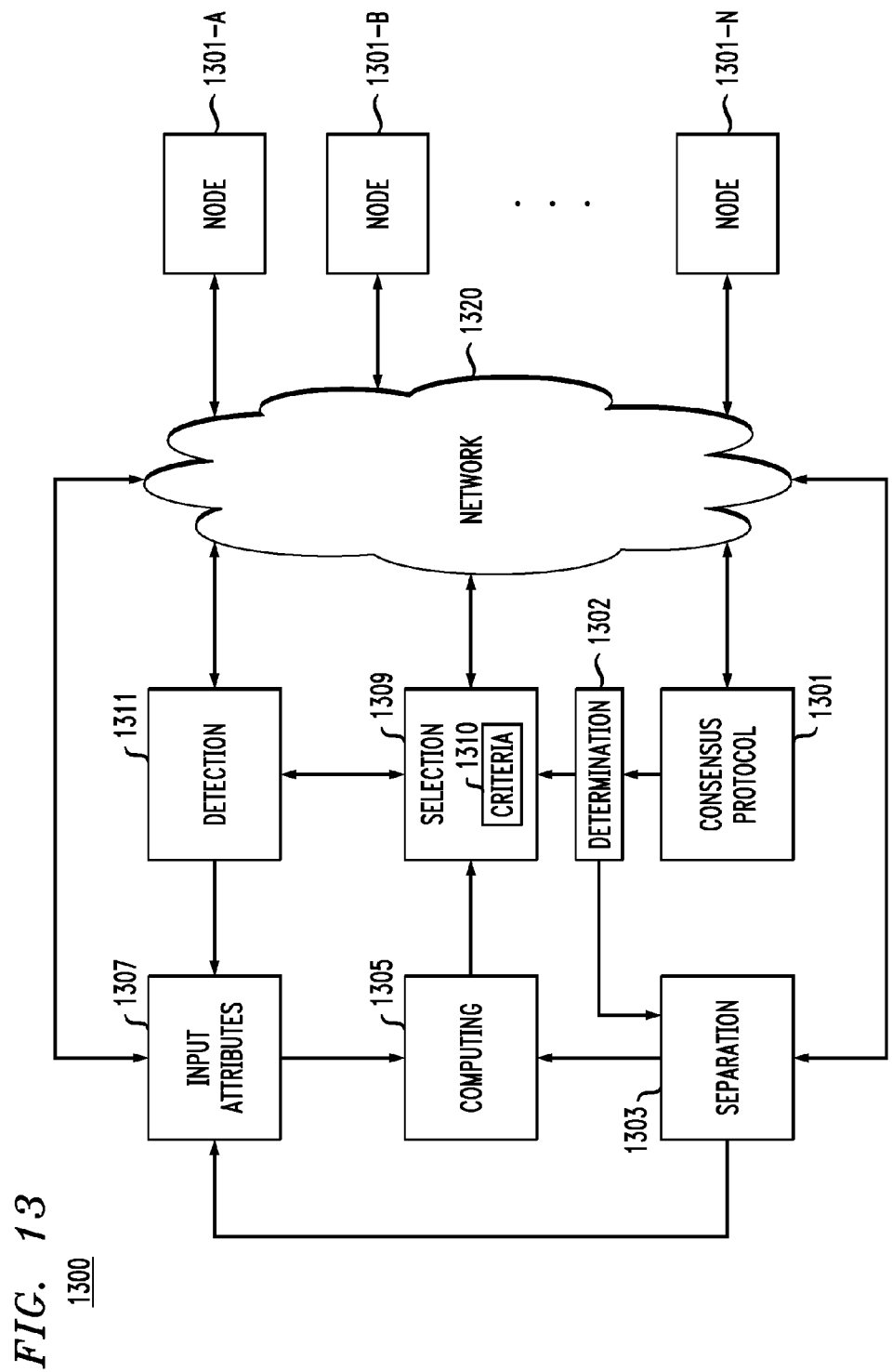
FIG. 13 is a diagram of a system for selecting a consensus protocol, according to an exemplary embodiment of the invention.

FIG. 13 is a block diagram of a system for selecting a consensus protocol, according to an exemplary embodiment of the invention. As shown in FIG. 13 by lines and/or arrows, the components of the system 1300 are operatively coupled to each other via, for example, physical connections, such as wired and/or direct electrical contact connections, and wireless connections, such as, for example, WiFi, BLUETOOTH®, IEEE 802.11, and/or networks, including but not limited to, a local area network (LAN), wide area network (WAN), cellular network, satellite network or the Internet.

As shown in FIG. 13, the system 1300 comprises a network 1320 including, but not limited to, a LAN, WAN, cellular network, satellite network or the Internet, and a plurality of nodes 1301-A, 1301-B, . . . , 1301-N connected to the network 1320, where N is a natural number greater than 1. The nodes 1301-A, 1301-B, . . . , 1301-N can be part of a distributed computing system, and can respectively comprise data centers or servers. Accordingly, a node 1301 may be, for example, one data center in a multiple data center system, or one server in a multiple server system. The system 1300 further includes a consensus protocol component 1301, a separation component 1303, a selection component 1309, a detection component 1311 and an input attributes component 1307 connected to the network 1320. The separation component 1303 is also connected to the consensus protocol component 1301, to a computing component 1305 and to the input attributes component 1307. The computing component 1305 is also connected to the input attributes component 1307 and the selection component 1309. The selection component 1309 includes a criteria component 1310.

The separation component 1303 receives a consensus protocol from the consensus protocol component 1301, and separates the received consensus protocol into one or more communication steps. As noted above, the consensus protocol may be, for example, an SP protocol, FP protocol or EP protocol useable to substantially maintain data consistency between nodes 1301 in a distributed computing system.

The computing component 1305 computes an estimated protocol-level delay based on one or more attributes received from the input attributes component 1307. The attributes are associated with the separated communication steps of the consensus protocol. The system 1302 also includes a determination component 1302 connected between the consensus protocol component 1301 and the separation component 1303, and connected to the selection component 1309. The determination component 1302 determines whether there are remaining consensus protocols for which to separate into communication steps and compute an estimated protocol-level delay. If yes, the determination component 1302 forwards the next consensus protocol to the separation component 1309 until the estimated protocol-level delay is computed for each of the consensus protocols. Once the determination component 1302 determines that there are no more consensus protocols for which an estimated protocol-level delay is to be computed, the determination component 1302 informs the selection component 1309 to select one of the consensus protocols (e.g., SP, FP or EP), based on the estimated protocol-level delays respectively computed for each of the consensus protocols by the computing component 1305. In accordance with an embodiment, the selection component 1309 selects the protocol with the lowest estimated protocol-level delay and/or highest throughput.

The detection component 1311 detects a configuration change in the distributed computing system. As noted above, the configuration change can include, for example, changes to workload network configurations. If the detection component 1311 detects a configuration change, the selection component 1309 re-selects one of the consensus protocols to substantially maintain data consistency between the nodes 1301 in the distributed computing system. The re-selection is based on re-estimated protocol-level delays respectively computed for the consensus protocols due to the detected configuration change in the distributed computing system. The computing component 1305 respectively computes the re-estimated protocol-level delays. According to an embodiment, the protocol with the lowest re-estimated protocol-level delay and/or highest throughput based on the detected configuration change is selected by the selection component 1309. If there is no detected configuration change, the selected consensus protocol is implemented.

In accordance with an embodiment of the present invention, the selection component includes a criteria component 1310, which provides one or more distribution selection criteria that can be used when selecting a consensus protocol. For example, as discussed above in connection with FIG. 12, the selection criteria can include, but is not limited to, arrival rate ($\lambda$) and time sync deviation among nodes ($\sigma$).

Figure 14:
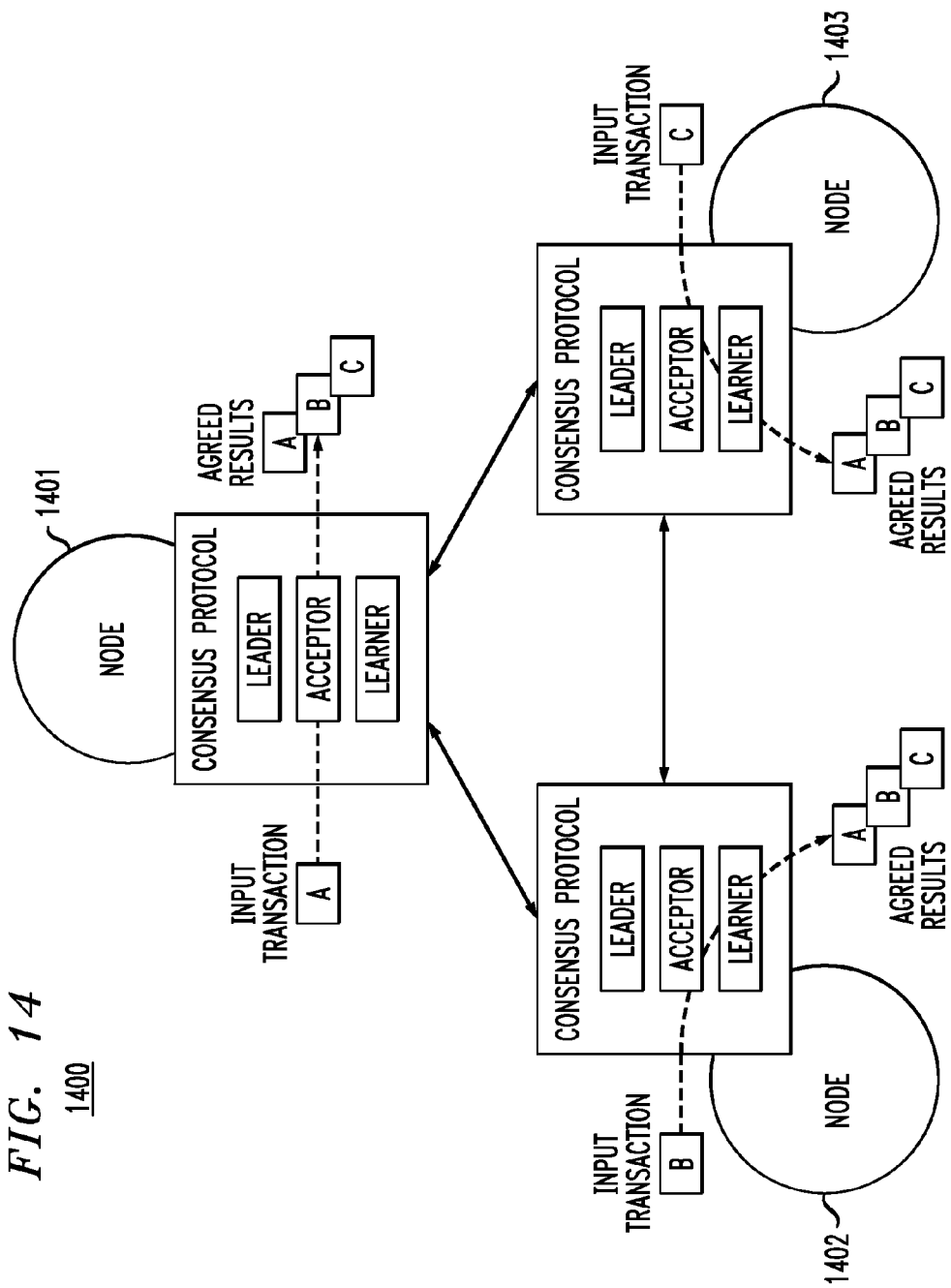
FIG. 14 is a diagram showing a setting for which a consensus protocol may be selected, according to an embodiment of the present invention.

FIG. 14 is a diagram showing a setting 1400 for which a consensus protocol may be selected, according to an embodiment of the present invention. Considering three nodes (node 1401, 1402 and 1403), each node can be a leader, acceptor or learner. Each node can be viewed as a state machine, which maintains its current state.

The state can change, after some leader proposes a new state. The objective of the consensus protocol is to guarantee that the states of all the nodes are the same, after the consensus converges. A leader is a node that proposes a new state, acceptors are the nodes that will participate in the consensus making procedure, and learners are nodes that will follow the decision made by the leader and acceptors.

Each node may have a different input (which is a proposal). All nodes have the set of agreed results, which can be viewed as their agreed sequence of state transition, in the past or still to be completed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 15:
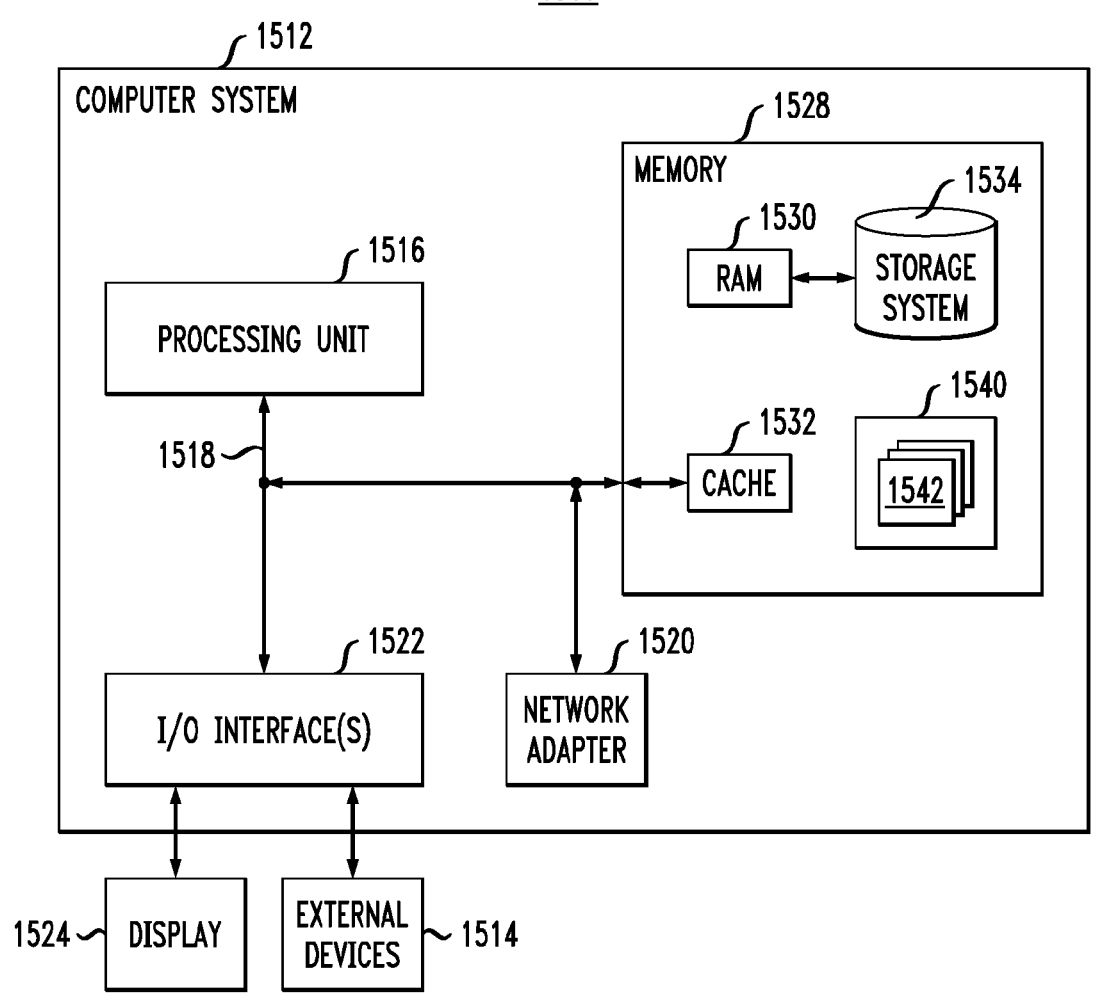
FIG. 15 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 15, in a computing node 1510 there is a computer system/server 1512, which is operational with numerous other general purpose or special purpose computing system environments or configurations. Examples of well-known computing systems, environments, and/or configurations that may be suitable for use with computer system/server 1512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 1512 in computing node 1510 is shown in the form of a general-purpose computing device. The components of computer system/server 1512 may include, but are not limited to, one or more processors or processing units 1516, a system memory 1528, and a bus 1518 that couples various system components including system memory 1528 to processor 1516.

The bus 1518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1512 typically includes a variety of computer system readable media. Such media may be any available media that is accessible by computer system/server 1512, and it includes both volatile and non-volatile media, removable and non-removable media.

The system memory 1528 can include computer system readable media in the form of volatile memory, such as random access memory (RAM) 1530 and/or cache memory 1532. The computer system/server 1512 may further include other removable/non-removable, volatile/nonvolatile computer system storage media. By way of example only, storage system 1534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1518 by one or more data media interfaces. As depicted and described herein, the memory 1528 may include at least one program product having a set (e.g., at least one) of program modules that are configured to carry out the functions of embodiments of the invention. A program/utility 1540, having a set (at least one) of program modules 1542, may be stored in memory 1528 by way of example, and not limitation, as well as an operating system, one or more application programs, other program modules, and program data. Each of the operating system, one or more application programs, other program modules, and program data or some combination thereof, may include an implementation of a networking environment. Program modules 1542 generally carry out the functions and/or methodologies of embodiments of the invention as described herein.

Computer system/server 1512 may also communicate with one or more external devices 1514 such as a keyboard, a pointing device, a display 1524, etc., one or more devices that enable a user to interact with computer system/server 1512, and/or any devices (e.g., network card, modem, etc.) that enable computer system/server 1512 to communicate with one or more other computing devices. Such communication can occur via Input/Output (I/O) interfaces 1522. Still yet, computer system/server 1512 can communicate with one or more networks such as a local area network (LAN), a general wide area network (WAN), and/or a public network (e.g., the Internet) via network adapter 1520. As depicted, network adapter 1520 communicates with the other components of computer system/server 1512 via bus 1518. It should be understood that although not shown, other hardware and/or software components could be used in conjunction with computer system/server 1512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:

separating each of a plurality of consensus protocols into one or more communication steps, wherein the consensus protocols are useable to substantially maintain data consistency between nodes in a distributed computing system, and wherein a communication step comprises a message transfer, attributable to a consensus protocol, in the distributed computing system;

computing, for each of the plurality of consensus protocols, an estimated protocol-level delay based on one or more attributes associated with the separated communication steps of a corresponding consensus protocol; and selecting one of the plurality of consensus protocols to substantially maintain the data consistency between the nodes in the distributed computing system, wherein the selection is based on the estimated protocol-level delays respectively computed for each of the plurality of consensus protocols;

wherein one of the plurality of consensus protocols comprises a single leader Paxos-type consensus protocol;

wherein the estimated protocol-level delay Tp for the single leader Paxos-type consensus protocol is computed as:

$$Tp = OD(Tr, \text{Poisson}(\lambda)) + \text{cond}(1/n, 0, L), \text{ where } \lambda \text{ is a workload arrival rate and}$$

$$Tr = Q(n, f, L), \text{ where}$$

$$f = \lceil n/2 \rceil - 1$$

wherein L is a network latency and n is the number of the nodes in the distributed computing system;

wherein another one of the plurality of consensus protocols comprises a fast Paxos-type consensus protocol;

wherein, for the fast Paxos-type consensus protocol, the estimated protocol-level delay Tp is computed as:

$$Tp = OD(Ti, \text{Poisson}(\lambda)), \text{ where } \lambda \text{ is the workload arrival rate and}$$

$$Ti = \text{cond}(pc, Tr + Tr, Tr)$$

$$Tr = Q(n, f, L), \text{ where}$$

$$f = \lceil n/3 \rceil - 1$$

wherein L is the network latency, pc is a collision probability, and n is the number of the nodes in the distributed computing system;

wherein yet another one of the plurality of consensus protocols comprises an epoch-based Paxos-type consensus protocol;

wherein, for the epoch-based Paxos-type consensus protocol, the estimated protocol-level delay Tp is computed as:

$Tp = W + OD(Te, \text{Fixed}(e))$, where $Te = \max(Ti)/n$ $Ti = Tr + S$ $Tr = Q(n, f, L)$, where $f = \lceil n/2 \rceil - 1$ wherein L is the network latency, W is an epoch wait time, S is a time synchronization difference, and n is the number of the nodes in the distributed computing system; and wherein the separating, computing, and selecting steps are performed via a processing device and a memory.

2. The method of claim 1, further comprising: detecting a configuration change in the distributed computing system; and re-selecting one of the plurality of consensus protocols to substantially maintain data consistency between the nodes in the distributed computing system, wherein the re-selection is based on re-estimated protocol-level delays respectively computed for each of the plurality of consensus protocols due to the detected configuration change in the distributed computing system.

3. The method of claim 1, further comprising improving the performance of a given one of the plurality of consensus protocols based on at least one of the one or more attributes associated with the separated communication steps of the given one of the protocols and one or more operating parameters of the given one of the protocols.

4. The method of claim 1, wherein the data consistency substantially maintained between the nodes in the distributed computing system comprises one of an execute-to-order data consistency or an order-to-execute data consistency.

5. The method of claim 1, wherein the nodes of the distributed computing system respectively comprise data centers.

6. The method of claim 1, wherein the nodes of the distributed computing system respectively comprise servers.

* * * * *